(12) United States Patent
Jackson

(10) Patent No.: US 12,509,410 B2
(45) Date of Patent: Dec. 30, 2025

(54) COMPOSITIONS AND METHODS FOR AN INTEGRATED 2,3,3,3-TETRAFLUOROPROPENE MANUFACTURING PROCESS

(71) Applicant: THE CHEMOURS COMPANY FC, LLC, Wilmington, DE (US)

(72) Inventor: Andrew Jackson, Newark, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 0 days.

(21) Appl. No.: 17/055,877

(22) PCT Filed: Jul. 8, 2019

(86) PCT No.: PCT/US2019/040818
§ 371 (c)(1),
(2) Date: Nov. 16, 2020

(87) PCT Pub. No.: WO2020/014130
PCT Pub. Date: Jan. 16, 2020

(65) Prior Publication Data
US 2021/0198168 A1   Jul. 1, 2021

Related U.S. Application Data

(60) Provisional application No. 62/695,233, filed on Jul. 9, 2018.

(51) Int. Cl.
| | | |
|---|---|---|
| *B01J 23/26* | (2006.01) | |
| *B01J 37/26* | (2006.01) | |
| *C07C 17/04* | (2006.01) | |
| *C07C 17/20* | (2006.01) | |
| *C07C 17/23* | (2006.01) | |
| *C07C 17/25* | (2006.01) | |
| *C07C 17/354* | (2006.01) | |
| *C07C 21/18* | (2006.01) | |

(52) U.S. Cl.
CPC .............. *C07C 21/18* (2013.01); *B01J 23/26* (2013.01); *B01J 37/26* (2013.01); *C07C 17/04* (2013.01); *C07C 17/206* (2013.01); *C07C 17/23* (2013.01); *C07C 17/25* (2013.01); *C07C 17/354* (2013.01)

(58) Field of Classification Search
None
See application file for complete search history.

(56) References Cited

U.S. PATENT DOCUMENTS

| | | | |
|---|---|---|---|
| 4,220,608 A | 9/1980 | Feiring | |
| 4,465,786 A | 8/1984 | Zimmer et al. | |
| 6,548,719 B1 | 4/2003 | Nair et al. | |
| 8,624,067 B2 | 1/2014 | Nose et al. | |
| 8,884,082 B2 | 11/2014 | Sun et al. | |
| 8,907,147 B2 | 12/2014 | Wang et al. | |
| 2003/0022785 A1* | 1/2003 | Cerri | C07C 17/10 |
| | | | 502/224 |
| 2011/0160498 A1* | 6/2011 | Pigamo | C07C 17/206 |
| | | | 570/156 |
| 2012/0142981 A1 | 6/2012 | Souda et al. | |
| 2012/0215035 A1 | 8/2012 | Nappa | |
| 2012/0302803 A1* | 11/2012 | Yamashita | C07C 17/25 |
| | | | 570/156 |
| 2014/0235907 A1* | 8/2014 | Yang | C07C 17/25 |
| | | | 570/227 |
| 2016/0107960 A1* | 4/2016 | Ondrus | C07C 17/383 |
| | | | 570/189 |
| 2019/0300460 A1* | 10/2019 | Tirtowidjojo | C07C 17/357 |

FOREIGN PATENT DOCUMENTS

| | | | |
|---|---|---|---|
| CN | 102001912 A | 4/2011 | |
| JP | 2010229047 A | 10/2010 | |
| WO | 2012/074669 A1 | 6/2012 | |
| WO | 2015/095497 A1 | 6/2015 | |
| WO | 2016058569 A1 | 4/2016 | |
| WO | 2017/044724 A1 | 3/2017 | |
| WO | WO-2018048783 A1 * | 3/2018 | .............. C07C 17/25 |

OTHER PUBLICATIONS

English translation of patent No. CN102001912A, Published Apr. 6, 2011, pp. 1-7 (Year: 2011).*
PCT International Search Report and Written Opinion mailed Oct. 1, 2019.
Hazeldine, R, Fluoro-olefins. Part II. Synthesis and reactions of some 3:3:3-trihalogenopropenes, Journal of the Chemical Society, Jan. 1, 1953, pp. 3371-3378.
Xingxin, Duan, Practical Handbook of Fine Organic Synthesis, Chemical Industry Press, pp. 35-36, Jan. 31, 2000 (Translation not available).
Appollo Scientifc Co. "PC7820—3,3,3-Trifluoropropene—99%—677-21-4": https://web.archive.org/web/20080414172552/http://www.apolloscientific.co.uk:80/browse_results.asp?alpha=T.

* cited by examiner

*Primary Examiner* — Medhanit W Bahta

(57) ABSTRACT

A method of synthesizing 3,3,3-trifluoropropene including contacting 1,1,1,3-tetrachloropropane, in the vapor phase, at a temperature sufficient to effect dehydrochlorination to form 1,1,3-trichloro-1-propene. The 1,1,3-trichloro-1-propene is isolated and subsequently contacted, in the vapor phase, with hydrogen fluoride in the presence of a fluorination catalyst at a temperature sufficient to effect formation of 3,3,3-trifluoropropene.

12 Claims, 1 Drawing Sheet

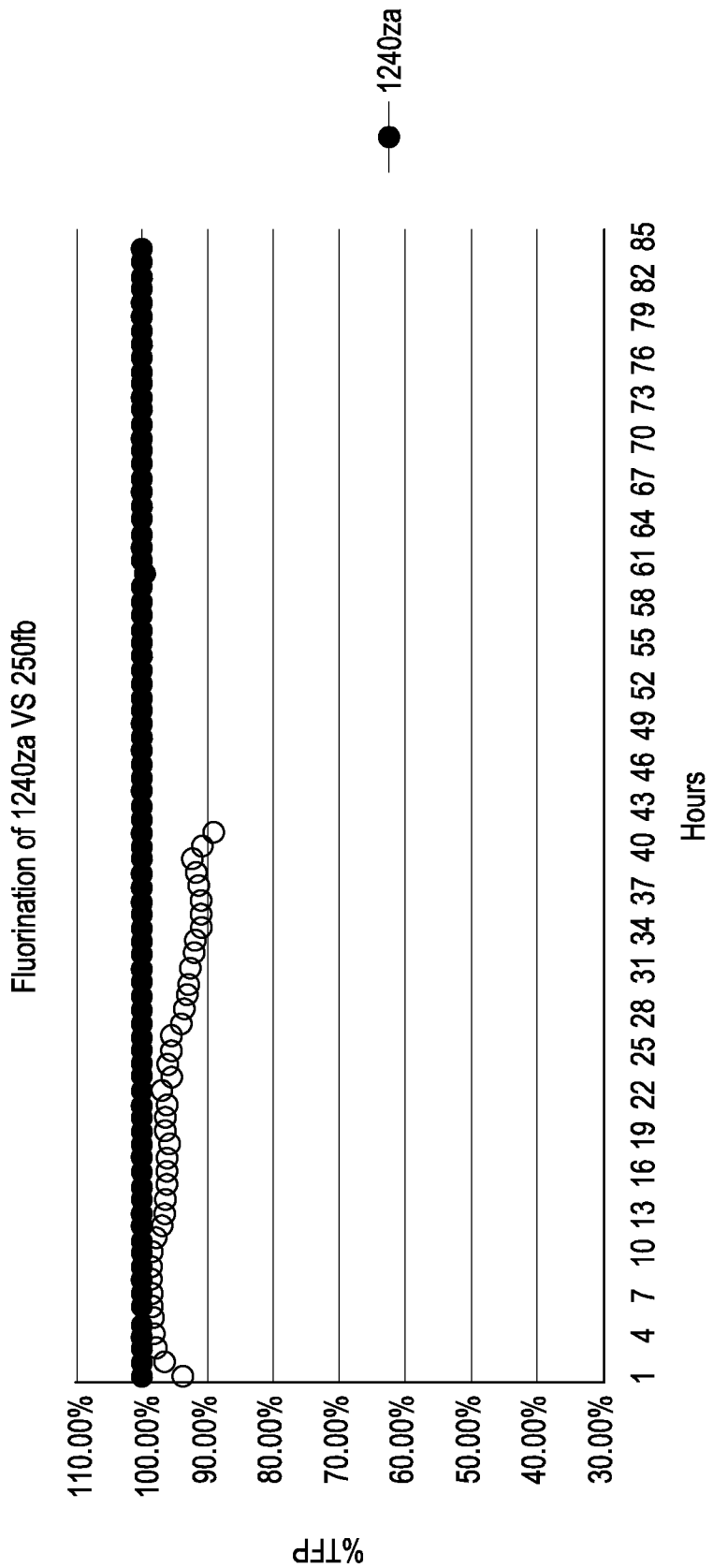

COMPOSITIONS AND METHODS FOR AN INTEGRATED 2,3,3,3-TETRAFLUOROPROPENE MANUFACTURING PROCESS

This application claims the benefit of U.S. Application No. 62/695,233, filed on Jul. 9, 2018. The disclosure of 62/695,233 is hereby incorporated by reference.

FIELD OF THE DISCLOSURE

The present invention is directed to compositions and methods of synthesis hydrofluoro-olefins (HFOs). More particularly, the present invention is directed to a method for the synthesis of 3,3,3-trifluoropropene (TFP or 1243zf) via a 1,1,3-trichloro-1-propene (1240za) intermediate as well as synthesis of 2,3,3,3-tetrafluoropropene (1234yf).

BACKGROUND INFORMATION

Hydrofluorocarbons (HFCs), such as hydrofluoro-olefins, have been disclosed as effective refrigerants, fire extinguishants, heat transfer media, propellants, foaming agents, blowing agents, gaseous dielectrics, sterilant carriers, polymerization media, particulate removal fluids, carrier fluids, buffing abrasive agents, displacement drying agents and power cycle working fluids. Hydrofluoro-olefins have replaced chlorofluorocarbons and hydrochlorofluorocarbons, which can potentially damage the Earth's ozone layer. Hydrofluoro-olefins do not contain chlorine, and, thus cannot degrade the Earth's ozone layer.

The synthesis of hydrofluoro-olefins may be accomplished by catalyzed vapor phase fluorination of chlorinated olefins. Vapor phase catalysis reactions expose the reagents to temperatures at or above their boiling point. A conventional synthesis scheme for the production of 3,3,3-trifluoropropene (TFP) involves the vapor phase fluorination of 1,1,1,3-tetrachloro propane with hydrofluoric acid (HF) in the presence of a catalyst. This reaction experiences loss of yield due to the decomposition of 1,1,1,3-tetrachloro propane at or above its boiling point of ° C. and reduction of selectivity due to the need for oxygen co-feed to extend the life of the catalyst.

A synthesis method for 3,3,3-trifluoropropene (TFP) which improves the yield and selectivity of the reaction while extending the catalyst lifetime, in comparison to the conventional synthesis route, would be desirable in the art.

SUMMARY

The invention can solve problems with conventional methods by providing compositions and methods for manufacturing 1243zf, 1240za as well as 1234yf. Such methods can have improved selectivity and yield.

In an embodiment, a method of synthesizing 3,3,3-trifluoropropene includes contacting 1,1,1,3-tetrachloropropane, with a base under conditions sufficient to effect dehydrochlorination to form 1,1,3-trichloro-1-propene and contacting the 1,1,3-trichloro-1-propene (e.g, in the vapor phase), with hydrogen fluoride in the presence of a fluorination catalyst under conditions sufficient to effect formation of 3,3,3-trifluoropropene.

In another embodiment, a method of synthesizing 2,3,3,3-tetrafluoropropene includes contacting 1,1,1,3-tetrachloropropane, with a base under conditions sufficient to effect dehydrochlorination to form 1,1,3-trichloro-1-propene. The method further includes contacting the 1,1,3-trichloro-1-propene (e.g., in the vapor phase), with hydrogen fluoride in the presence of a fluorination catalyst at under conditions sufficient to effect formation of 3,3,3-trifluoropropene and contacting the 3,3,3-trifluoropropene with one or more additional reagents sufficient to effect formation of 2,3,3,3-tetrachloropropene.

Another embodiment of the invention relates to any of the foregoing embodiments comprising a method of synthesizing 3,3,3-trifluoropropene comprising:
  contacting 1,1,1,3-tetrachloropropane, with a base at a temperature sufficient to effect dehydrochlorination to form 1,1,3-trichloro-1-propene; and
  contacting the 1,1,3-trichloro-1-propene, in the vapor phase, with hydrogen fluoride in the presence of a fluorination catalyst at a temperature sufficient to effect formation of 3,3,3-trifluoropropene.

One embodiment of the invention relates to any of the foregoing embodiments wherein the base includes sodium hydroxide, potassium hydroxide, or potassium tert-butoxide.

One embodiment of the invention relates to any of the foregoing embodiments and further comprising, recovering the 1,1,3-trichloro-1-propene from the reaction mixture prior to contacting the 1,1,3-trichloro-1-propene with hydrogen fluoride.

One embodiment of the invention relates to any of the foregoing embodiments and further comprising, recovering the 3,3,3-trifluoropropene from the reaction mixture.

One embodiment of the invention relates to any of the foregoing embodiments wherein the temperature sufficient to effect formation of 3,3,3-trifluoropropene is between 250° C. and 350° C.

One embodiment of the invention relates to any of the foregoing embodiments wherein the fluorination catalyst includes activated carbon, alumina, chromium oxide, oxides of transition metals, or metal halides.

One embodiment of the invention relates to any of the foregoing embodiments wherein at least a 95 percent selectivity of 3,3,3-trifluoropropene is maintained in a continuous reaction for at least 30 hours.

Another embodiment of the invention relates to any of the foregoing embodiments of the invention and using method of synthesizing 2,3,3,3-tetrafluoropropene comprising:
  contacting 1,1,1,3-tetrachloropropane with a base at a temperature sufficient to effect dehydrochlorination to form 1,1,3-trichloro-1-propene;
  contacting the 1,1,3-trichloro-1-propene, in the vapor phase, with hydrogen fluoride in the presence of a fluorination catalyst at a temperature sufficient to effect formation of 3,3,3-trifluoropropene; and
  contacting the 3,3,3-trifluoropropene with one or more additional reagents sufficient to effect formation of 2,3,3,3-tetrafluoropropene.

One embodiment of the invention relates to any of the foregoing embodiments wherein the step of contacting the 3,3,3-trifluoropropene with one or more additional reagents includes the steps of:
  contacting the 3,3,3-trifluoropropene in the vapor phase with chlorine gas at a temperature to effect formation of 2,3-dichloro-1,1,1-trifluoropropane;
  contacting the 2,3-dichloro-1,1,1-trifluoropropane in the vapor phase with a base at a temperature sufficient to effect dehydrochlorination to form 2-chloro-3,3,3-trifluoropropene;
  contacting the 2-chloro-3,3,3-trifluoropropene in the vapor phase, with hydrogen fluoride in the presence of a fluorination catalyst at a temperature sufficient to effect formation of 2-chloro-2,3,3,3-tetrafluoropropane; and contacting the 2-chloro-2,3,3,3-tetrafluoropropane in the vapor phase with a base at a temperature sufficient to effect dehydrochlorination to form 2,3,3,3-tetrafluoropropene.

One embodiment of the invention relates to any of the foregoing embodiments wherein the fluorination catalyst is selected from the group consisting of activated carbon, alumina, chromium oxide, oxides of transition metals, or metal halides and combinations thereof.

Another embodiment of the invention relates to any of the foregoing embodiments and to a composition comprising 3,3,3-trifluoropropene and to such compositions formed by any of the foregoing processes.

Another embodiment of the invention relates to any of the foregoing embodiments and to a composition comprising, 2,3,3,3-tetrafluoropropene and to such compositions formed by any of the foregoing processes.

The various embodiments can be used alone or in combinations with each other.

Other features and advantages of the present invention will be apparent from the following more detailed description, taken in conjunction with the accompanying drawings which illustrate, by way of example, the principles of the invention.

BRIEF DESCRIPTION OF THE DRAWINGS

The FIGURE is a graphical representation of TFP reaction selectivity as a function of time.

DETAILED DESCRIPTION

The foregoing general description and the following detailed description are exemplary and explanatory only and are not restrictive of the invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

As used herein the phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

As used herein the phrase "consisting essentially of" is used to define a composition, method that includes materials, steps, features, components, or elements, in addition to those literally disclosed provided that these additional included materials, steps, features, components, or elements do not materially affect the basic and novel characteristic(s) of the claimed invention, especially the mode of action to achieve the desired result of any of the processes of the present invention. The term 'consisting essentially of' occupies a middle ground between "comprising" and 'consisting of'.

The term "selectivity," as used herein, means the ratio of the numbers of moles of the desired product to the number of moles of undesired products expressed as a percentage. The selectivity can range from about 85 to about 100%, and in some cases about 90 to 95%, The term "yield," as used herein, means the ratio of the amount of product produced to the theoretical maximum amount of product, based on the amount of the limiting reagent. The yield can range from about 85 to about 100%, and in some cases about 90 to about 95%.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

Provided is a method of making hydrofluoro-olefins (HFOs) from hydrochloro-olefin and hydrochlorofluoro-olefin reagents and intermediates. In an exemplary embodiment, 2,3,3,3-tetrafluoropropene (1234yf) is produced, via a multi-step or an integrated process, from a 1,1,1,3-tetrachloropropane reagent (250fb).

The fluorination process may be conducted in any reactor suitable for a vapor phase fluorination reaction. The reactor is made of a material that is resistant to the reactants employed. The reactor may be constructed from materials which are resistant to the corrosive effects of hydrogen fluoride such as stainless steel, Hastelloy, Inconel, Monel, gold or gold-lined or quartz. The reactions may be conducted batchwise, continuous, semi-continuous or combinations thereof. Suitable reactors include batch reactor vessels and tubular reactors.

In an embodiment, 1,1,1,3-tetrachloropropane (250fb) is charged to a reactor, heated, and contacted, in the liquid phase, under an inert atmosphere, in the presence of a catalyst, with a base under conditions sufficient to effect dehydrochlorination to form 1,1,3-trichloro-1-propene (1240za), as shown in Scheme (1).

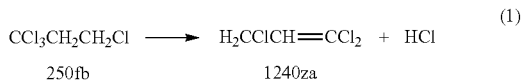

(1)

For example, the pressure can range from about 0 to about 150 psig, about 25 to 125 and in some cases about 50 to 100 psig, For example, the ratio of catalyst comprising a phase transfer catalyst (PTC) (e.g., at least one amine containing compound such as quaternary amine salts and others) to 250fb ranges from about 0.001 to about 0.25, about 0.01 to about 0.1 and, in some cases, about 0.02 to about 0.05. For example, the ratio of reaction products, 1240za+aq HCl is typically 1 to 1. If desired at least one solvent can employed along with the PTC such as at least one member selected from the group consisting of alcohols (e.g., methanol, ethanol, and propanol), aromatic compounds (e.g., tolune, and benzene), tetrahydofurane, among others.

While any suitable inert gas can employed, an example of a suitable gas comprises nitrogen, helium, and argon Suitable bases include sodium hydroxide, potassium hydroxide, potassium tert-butoxide, and combinations thereof. While any suitable amount of base (mole ratio) can be employed, the amount can range from 0.03 to about 2, about 0.5 to about 1.5 and in some cases about 1 to about 1.2. Suitable temperatures are such that the 250fb reagent is in the liquid phase. In some embodiments, the reaction mixture is heated to a temperature of 20 to 130° C. or 80 to 110° C.

In one embodiment, treating 1,1,1,3-tetrachloropropane with base produces a mixture comprising 1,1,3-trichloro-1-propene (1240za) and 3,3,3-trichloro-1-propene (1240zf). 1240zf can be isomerized to 1240za upon distillation/heating of the mixture (for example, heating at a temperature of about 132 C).

Alternatively, the previously described dehydrochlorination may be performed in the vapor phase as a thermally driven process in the presence of a dehydrochlorination catalyst. Suitable catalysts include Lewis acids, activated carbon, alumina, chromium oxide, oxides of transition metals, metal halides, and combinations thereof. The amount of catalyst can range from about 0.001 to about 0.25, about 0.005 to about 0.1 and in some cases about 0.01 to about 0.05. In some embodiments, the reaction mixture is heated to a temperature of 200° C. to 350° C., about 225 to about 325 and in some cases about 250 to 300. One example of a suitable thermally drive process is disclosed in WO 2012074669 A1 by Nappa, Lousenberg and Jackson, the disclosure of which is hereby incorporated by reference.

In one embodiment, the aforementioned thermal driven reaction of 1,1,1,3-tetrachloropropane produces a reaction product consisting essentially of and in some cases consisting of 1240za.

The reaction mixture comprising 1,1,3-trichloro-1-propene (1240za) may optionally be treated before further use, for example, in order obtain purified 1240za. In some embodiments, the 1,1,3-trichloro-1-propene (1240za) is purified by distillation. In some embodiments, the distillation may be performed by heating the reaction mixture to a temperature greater than the boiling point of 1,1,3-trichloro-1-propene (1240za) (about 132° C.) and less than the boiling point of 1,1,1,3-tetrachloropropane (250fb) (about 155° C.). In some embodiments, the distillation may be performed at ambient pressure. The purity of 1240za can range from about 75% to about 90%, about 90% to about 95 and in some cases about 95% to about 99.9%. Unreacted 1,1,1,3-tetrachloropropane (250fb) may be collected or recycled to the reactor for conversion into 1,1,3-trichloro-1-propene (1240za).

In an embodiment, 1,1,3-trichloro-1-propene (e.g., purified 1240za obtained from the previously described methods) is fed into a reactor and contacted with hydrogen fluoride (HF), in the vapor phase, under conditions sufficient to effect the formation of 3,3,3-trifluoropropene (1243zf), as shown in Scheme (2).

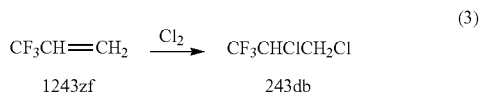

1240za    1243zf

The pressure employed in this embodiment can range from about 0 to about 25, and, in some cases, about 10 to about 20. In some embodiments, the reaction may be performed without a catalyst. In some embodiments, the reaction may be performed in the presence of a catalyst. Suitable catalysts include activated carbon, alumina, chromium oxide, oxides of transition metals, and metal halides. For example, this embodiment can be conducted as a vapor phase reaction including a reaction run in a packed bed reactor and, accordingly, catalyst to reactant range can be expressed in terms of contact time or flow. Contact time can range from about 1 second to 120 seconds, 1 second to 60 seconds and 1 second to 6 seconds. In some embodiments, the reaction may exhibit a selectivity for the formation of 1243zf of at least 95 percent for at least 30 hours, at least 40 hours, at least 50 hours, at least 60 hours, at least 70 hours, at least 80 hours, or at least 82 hours. In some embodiments, the reaction mixture is heated to a temperature between about 250 and 350° C., between 270 and 325° C., or between 285 and 310° C.

In some embodiments, the reaction may be performed at a temperature which allows for the simultaneous removal of by-product HCl and 3,3,3-trifluoropropene (1243zf) product and also allowing for any unreacted 1,1,3-trichloro-1-propene (1240za) to be recycled back to the reaction. In some embodiments, the HCl and 3,3,3-trifluoropropene (1243zf) are separated in the gas phase. In some embodiments, the reaction may be performed at a temperature below the boiling point of 1,1,3-trichloro-1-propene (1240za) (132° C.). In some embodiments, a further separation may be performed to substantially remove the HCl from the 3,3,3-trifluoropropene (1243zf).

In an embodiment, 3,3,3-trifluoropropene (1243zf) is contacted with chlorine gas ($Cl_2$) to form 2,3-dichloro-1,1,1-trifluoropropene (243db) (243db), as shown in Scheme (3).

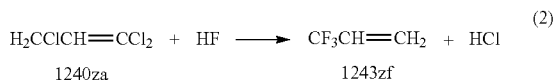

1243zf    243db

For example, this embodiment can be conducted in accordance with the method described in WO 2015095497A1; the disclosure of which is hereby incorporated by reference.

In one embodiment, the chlorination may be conducted in the presence of a catalyst. Suitable catalysts include activated carbon, alumina, chromium oxide, oxides of transition metals, metal halides, and combinations thereof. The amount of catalyst can range from about 0.001 to about 0.25, about 0.005 to about 0.1 and in some cases about 0.01 to about 0.05. Suitable reaction temperatures include temperatures in the range of about 75° C. to about 120° C. or about 80° C. to about 90° C. The resulting selectivity of the reaction may be greater than 95 percent, greater than 97 percent, or greater than 98 percent.

In one embodiment, the chlorination may be conducted without a catalyst via a thermal route. The thermal route typically employs higher temperatures than the catalytic route described above (e.g., 230 to 280° C.) and typically results in a selectivity of about 80 to 90 percent.

The reaction product comprising 2,3-dichloro-1,1,1-trifluoropropene (243db) may be treated before further use in order to obtain purified 243db. In some embodiments, the 2,3-dichloro-1,1,1-trifluoropropene (243db) is purified by distillation. In one embodiment, the distillation may be performed by heating the reaction mixture to a temperature less than the boiling point of 2,3-dichloro-1,1,1-trifluoropropane (243db) (77° C.) and greater than the boiling point of 3,3,3-trifluoropropene (1243zf), (−22° C.). Unreacted 3,3,3-trifluoropropene (1243zf) may be collected and recycled to the reaction to increase yield.

In an alternate embodiment, the 1,1,1-trifluoro-1-propene (1243zf) may be simultaneously contacted with hydrogen fluoride (HF) and chlorine (Cl$_2$) to convert the 1,1,1-trifluoro-1-propene (1243zf) to 2-chloro-1,1,1-trifluoropropene (1233xf) and 2,3-dichloro-1,1,1-trifluoropropene (243db) in a single step reaction, as shown in formula (3A).

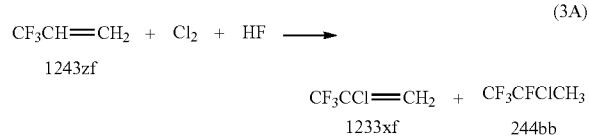

In some embodiments, the reaction may be performed without a catalyst. In some embodiments, the reaction may be performed in the presence of a catalyst. Suitable catalysts include activated carbon, alumina, chromium oxide, oxides of transition metals, metal halides, and combinations thereof. In some embodiments, the 2-chloro-1,1,1-trifluoropropene (1233xf) and 2,3-dichloro-1,1,1-trifluoropropene (243db) may be separated from the reaction mixture in one or more treatment steps (e.g., purification by distillation). In some embodiments, the reaction mixture may be used without purification.

In an embodiment, 2,3-dichloro-1,1,1-trifluoropropene (243db), in the vapor phase, undergoes a dehydrochlorination reaction to form 2-chloro-3,3,3-trifluoropropene (1233xf), as shown in Scheme (4).

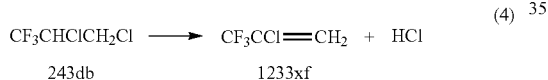

In one embodiment, the dehydrochlorination is a thermally driven process in the presence of a dehydrochlorination catalyst. The amount of catalyst can range from about 0.001 to about 0.25, about 0.005 to about 0.1 and in some cases about 0.01 to about 0.05. Suitable catalysts include activated carbon, alumina, chromium oxide, oxides of transition metals, metal halides, and combinations thereof. The temperature employed for the thermal process can range from about 50 to about 350, about 100 to about 250 and in some cases about 150 to about 225.

In another embodiment, the dehydrochlorination is carried out by passing 243db through a reaction zone containing activated carbon. The process can be conducted in accordance with U.S. Pat. No. 8,884,082 B2; the disclosure of which is hereby incorporated by reference.

The selectivity of the reaction versus the constitutional isomer 1-chloro-3,3,3-trifluoro-1-propene (1233zd) is typically observed over a range of about 50 to about 92 percent. If hydrogen fluoride (HF) is co-fed with the 243db into the reaction, the formation of 1233zd is suppressed resulting in improved selectivity of the 1233xf. In some embodiments, the selectivity of 1233xf formation may be at greater than about 92 percent, greater than about 94 percent, or greater than about 95 percent. The amount of HF can vary in accordance with US 20120215035 A1; the disclosure of which is hereby incorporated by reference.

Alternatively, the dehydrochlorination may be performed in the liquid phase by contacting the 243db with a strong base, such as sodium hydroxide, potassium hydroxide, potassium tert-butoxide, calcium oxides, or calcium hydroxide. The liquid phase dehydrochlorination may be performed in the presence or absence of a dehydrochlorination catalyst. If desired, the dehydrochlorination of this embodiment may be conducted in accordance with WO 2017/044724 A11 the disclosure of which is hereby incorporated by reference.

If desired, the reaction product comprising 2-chloro-3,3,3-trifluoropropene (1233xf) may be treated before further use in order to obtain purified 1233xf. The purity of 1233xf can range from about 85 to about 100, about 90 to about 95 and in some cases about 99 to less than about 100. In some embodiments, the reaction product comprising 2-chloro-3,3,3-trifluoropropene (1233xf) is treated by distillation in order to obtain purified 1233xf. In one embodiment, the distillation may be performed by heating the reaction mixture to a temperature less than the boiling point of 2,3-dichloro-1,1,1-trifluoropropane (243db) (77° C.) and greater than the boiling point of 2-chloro-3,3,3-trifluoropropene (1233xf), (28° C.). Unreacted 2,3-dichloro-1,1,1-trifluoropropane (243db) may be collected and recycled to the reaction to increase yield.

In an embodiment, 2-chloro-3,3,3-trifluoropropene (1233xf), in the liquid phase, is contacted with hydrogen fluoride, in the presence of a catalyst, and undergoes a hydrofluorination reaction to form 2-chloro-1,1,1,2-tetrafluoropropane (244bb), as shown in Scheme (5).

The pressure can range from about 50 to about 250 psig, about 100 to about 200 and, in some cases, about 125 to about 175 psig. The ratio of reactants HF:1233xf ratio (Moles) can range from about 1 to about 150, about 25 to about 125 and, in some cases, about 50 to about 100. The catalyst ratio can range from about 0.01 to about 3, about 0.5 to about 2 and, in some cases, about 0.75 to about 1.75.

In one embodiment, the catalyst is a Lewis acid catalyst such as SbCl$_5$, TiCl$_4$, SbF$_5$, SnCl$_4$, SbCl$_3$, TaF$_4$, or TiF$_4$. In one embodiment, the Lewis acid catalyst is an antimony-based compound represented by SbCl$_x$F$_{5-x}$. The amount of amount of catalyst (mole ratio) can range from about 0.01 to about 100, about 0.1 to about 50 and, in some cases, about 1 to about 1.5. The selectivity of the reaction is typically in the range of 80 to 99 percent, or 90 to 99 percent. The yield of the reaction is typically at least 90 percent. In some embodiments, the yield is greater than 95 percent, greater than 97 percent, or greater than 99 percent.

Alternatively, the hydrofluorination may be performed in the vapor phase in the presence of a catalyst. Suitable vapor phase catalysts include antimony chloride on carbon (SbCl$_5$/C). The amount of catalyst (i.e., loading on carbon), can range from about 0.1% to about 30%, about 1% to about 20% and, in some cases, about 5 to about 10%. The selectivity of the vapor phase process may be greater than 95 percent, greater than 97 percent, or greater than 98 percent. Yields have been observed up to about 92 percent.

In an embodiment, 2-chloro-1,1,1,2-tetrafluoropropane (244bb), in the vapor phase, undergoes a dehydrochlorination reaction to form 2,3,3,3-tetrafluoropropene (1234yf), as shown in Scheme (6).

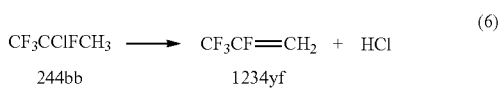

(6)

The reaction can be conducted at a pressure from about 0 to about 200 psig, about 50 to about 150 and, in some cases, about 75 to about 125 psig. In one embodiment, the dehydrochlorination is a thermally driven process in the presence of a dehydrochlorination catalyst. Suitable catalysts include activated carbon, Pd/C, Pt/C, $MgF_2$, $Cr_2O_3$, MgO, $FeCl_3$, $CsCl/MgF_2$, and KCl/C. The amount of catalyst can range from about 0.001 to about 0.25, about 0.005 to about 0.1 and in some cases about 0.01 to about 0.05. The temperature can range from about 25 C to about 450 C, about 100 C to about 350 C and, in some cases, about 225 to about 300 C. The selectivity of the reaction may be between 80 and 92 percent, between 85 and 90 percent and, in some cases, greater than about 90 and less than about 100.

In one embodiment, the dehydrochlorination may be conducted without a catalyst by a thermal pyrolysis route. In one embodiment, the reaction mixture is heated to about 300 to 6000, about 400 to 550 and in some cases about 460 to 500° C. in the absence of oxygen. Selectivity of greater than 98 percent may be achieved.

Alternatively, the dehydrochlorination may be performed in the liquid phase by contacting the 244bb with a strong base, such as sodium hydroxide, potassium hydroxide, potassium tert-butoxide, calcium oxides, or calcium hydroxide, in the presence of a catalyst. The dehydrochlorination can be conducted at a pressure of about 0 to about 250 psig, about 75 to 200 and, in some cases, about 100 to about 175 psig While any suitable amount of base (mole ratio) can be employed, the amount can range from 0.03 to about 3, about 0.5 to about 2 and in some cases about 1 to about 1.2. Catalyst-phase transfer catalyst (PTC) (e.g., amine containing including quaternary amine salts and others) to 250fb ranges from 0.001 to 0.25, 0.01 to 0.1 and 0.02 to 0.05.

The reaction product comprising 2,3,3,3-tetrafluoropropene (1234yf) may be further treated in order to obtain purified 1234yf. The purified 1234yf can 75% to about 90%, about 90% to about 99.5% and in some cases about 95% to about 99.9% pure. In some embodiments, the 2,3,3,3-tetrafluoropropene (1234yf) is purified by distillation. In one embodiment, the distillation may be performed by cooling the reaction mixture to a temperature less than the boiling point of 2,3,3,3-tetrafluoropropene (1234yf), (−29.5° C.). Unreacted 1-chloro-1,1,1,2-tetrafluoropropene (244bb) may be recycled to the reaction to increase yield.

An overall reaction scheme for the production of 1234yf incorporating Schemes 1-6 described above is shown in Scheme 7.

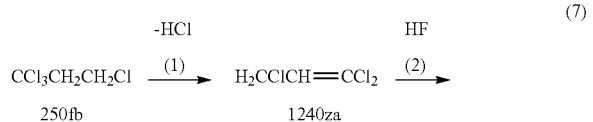

(7)

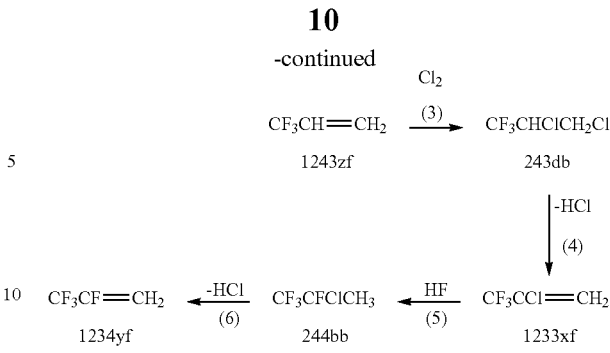

The following Examples are provided to illustrate certain embodiments of the invention and do not limit the scope of the appended claims.

EXAMPLES

Catalyst Activation

Example 1

Into a Hastelloy tube (12" by ½") was added 6 cc of 10% Cr/AC catalyst (12-20 mesh). The catalyst bed was purged with 30 standard cubic centimeters per minute (sccm) of nitrogen ($N_2$) and the temperature was set at 150° C. for 2 hours and 250° C. for 2 hours. The temperature was decreased to 200° C., the $N_2$ flow was changed to 60 sccm and anhydrous HF flow was fed at 20 sccm for 1 hour. Then the temperature was set at 250 and 300° C. each for 1 hour. While at 300° C., the $N_2$ and HF flows were changed to 20 and 30 sccm respectively for 1 hour. Then the HF flow was changed to 48 sccm and the temperature was changed to 325° C. for 2 hours. The $N_2$ flow was then stopped and the HF flow was maintained at 48 sccm for 1 hour to complete the catalyst activation.

Example 2

1,1,3-trichloro-1-propene (1240za) Conversion to 3,3,3-trifluoro-1-propene (1243zf)

1240za was fed using a syringe pump at about 0.2 cc/hr and HF was fed using a mass flow controller at about 12.5 sccm. The organic and HF streams were mixed in a vaporizer heated at 150° C. prior to entering the reactor. The reaction was run at 300° C. and atmospheric pressure. Analysis of samples were performed by direct injection of the product stream onto an Agilent 7890A GC quipped with a 5975C MS. The gas chromatography column used to analyze the product stream was a 20 meter×⅛" Krytox® column from Restek®.

Example 3

1,1,1,3-tetrachloropropane (250fb) Conversion to 3,3,3-trifluoro-1-propene (1243zf) (Comparative)

250fb was fed using a syringe pump at about 0.2 cc/hr and HF was fed using a mass flow controller at about 12.5 sccm. The organic and HF streams were mixed in a vaporizer heated at 150° C. prior to entering the reactor. The reaction was run at 300° C. and atmospheric pressure. Analysis of samples were performed by direct injection of the product stream onto an Agilent 7890A GC quipped with a 5975C MS. The gas chromatography column used to analyze the product stream was a 20 meter×⅛" Krytox® column from Restek®.

Example 4

The performance of 1240za and 250fb were evaluated by comparing selectivity for 1243zf (TFP). Results show that 1240za maintained TFP selectivity >95% for over 84 hours compared to 250fb which only maintained 95% 1243zf selectivity for 26 hours. A graph of the reaction TFP selectivity, a proxy for catalyst lifetime, is shown in the FIGURE. Optionally, an oxygen co-feed may be incorporated in the reactions to prolong catalyst life. In the examples presented above oxygen was omitted as a co-feed in the reactions.

The comparative and inventive reactions described above were run using the same HF flow rates for the reagent feeds. As illustrated in the FIGURE this results in the 1240za to 1243zf route exhibiting an extended catalyst lifetime versus the 250fb to 1243zf route. One conventional approach to extending the catalyst lifetime in working with 250fb is to increase the flow rate of HF to provide a large excess (e.g., greater than 20 molar equivalents excess) of HF in the reactor. The inventive 1240za to 1243zf route described above reduces the amount of HF needed in the reaction, thus, potentially reducing the reactor size and amounts of reagents needed in the process.

As shown in the FIGURE, the 1240za to 1243zf route results in an extended catalyst lifetime versus the 250fb to 1243zf route. One conventional approach to extending the catalyst lifetime is to co-feed oxygen into the reaction. While oxygen may extend the catalyst life, oxygen may also reduce the selectivity of the reaction. The extended catalyst lifetime may reduce or eliminate the need to co-feed oxygen into the reaction to extend the catalyst life, thereby maintaining the reaction selectivity while reducing the overall reagents necessary for the reaction.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An integrated process of converting 1,1,1,3-tetrachloropropane to 2,3,3,3-tetrafluoropropene, comprising;
    (a) dehydrochlorinating 1,1,1,3-tetrachloropropane (HCC-250fb) in the liquid phase, under an inert atmosphere and temperatures between 80° C. and 110° C., in the presence of a catalyst and a strong base to form a product mixture containing 1,1,3-trichloro-1-propene (HCO-1240za),
    (b) recovering the product mixture of (a),
    (c) treating the product mixture of (b) to form an intermediate feed of 1,1,3-trichloro-1-propene (HCO-1240za) having a purity between 90 mole % to about 99.9 mole %,
    (d) continuously feeding and fluorinating the intermediate feed (c) of 1,1,3-trichloro-1-propene (HCO-1240za) at a temperature between 270° C. and 325° C., in the presence of at least one of activated carbon, alumina, and chromium oxide fluorided with discrete $N_2$:HF mixtures, to form 3,3,3-trifluoropropene (HFO-1243zf) and maintain a selectivity to HFO-1243zf of at least 95% over a period of at least 40 hours, and
    (e) converting the 3,3,3-trifluoropropene (HFO-1243zf) to 2,3,3,3-tetrafluoropropene (HFO-1234yf) in the presence of a second fluorination catalyst.

2. The integrated process of claim 1, wherein (e) comprises:
    (f) first contacting HFO-1243zf in the vapor phase with chlorine gas at a temperature to effect formation of 2,3-dichloro-1,1,1-trifluoropropane (HCFC-243db) with selectivity to HCFC-243db of >95%;
    (g) contacting the HCFC-243db from (f) and HF at a temperature to effect a second dehydrochlorination to selectively form 2-chloro-3,3,3-trifluoropropene (HCFO-1233xf);
    (h) contacting the HCFO-1233xf of (g) in the vapor phase with hydrogen fluoride in the presence of a second fluorination catalyst at a temperature sufficient to effect formation of 2-chloro-2,3,3,3-tetrafluoropropane; and
    (i) contacting the 2-chloro-2,3,3,3-tetrafluoropropane of (h) in one of the vapor phase or the liquid phase with a base to effect a third dehydrochlorination to form the HFO-1234yf.

3. The integrated process of claim 1 further comprising, recovering the 3,3,3-trifluoropropene from the reaction mixture prior to conversion to 2,3,3,3-tetrafluoropropene.

4. The integrated process of claim 1, wherein the fluorination catalyst of (d) further includes one of oxides of transition metals or metal halides.

5. The integrated process of claim 1, wherein the fluorination catalyst of (d) has a fluorine content defined by contact with discrete $N_2$:HF mixtures at discrete temperatures of 200° C., 250° C., 300° C. and 325° C.

6. The integrated process of claim 5, wherein the fluorination catalyst of (d) has a fluorine content defined by contact with discrete $N_2$:HF mixtures at the discrete temperatures of 300° C. and 325° C.

7. The integrated process of claim 6, wherein the second fluorination catalyst is selected from the group consisting of activated carbon, alumina, chromium oxide, oxides of transition metals, or metal halides and combinations thereof.

8. The integrated process of claim 7 wherein the second fluorination catalyst comprises chromium oxide and activated carbon.

9. The integrated process of claim 6 wherein the third dehydrochlorination is performed in the presence of a catalyst.

10. The integrated process of claim 6, wherein the product of each successive step (f)-(i) is first subjected to a recovery step.

11. The integrated process of claim 1, wherein the fluorination catalyst of (d) has a fluorine content defined by contact with discrete $N_2$:HF mixtures at discrete temperatures between 200° C. and 325° C.

12. The integrated process of claim 1, wherein the fluorination catalyst of (d) comprises activated carbon and chromium oxide.

* * * * *